April 26, 1960 J. L. CULBERTSON 2,934,605

TOLL-DISCRIMINATING OUTGOING REPEATER SYSTEM

Filed Dec. 7, 1954 2 Sheets-Sheet 1

April 26, 1960 J. L. CULBERTSON 2,934,605
TOLL-DISCRIMINATING OUTGOING REPEATER SYSTEM
Filed Dec. 7, 1954 2 Sheets-Sheet 2
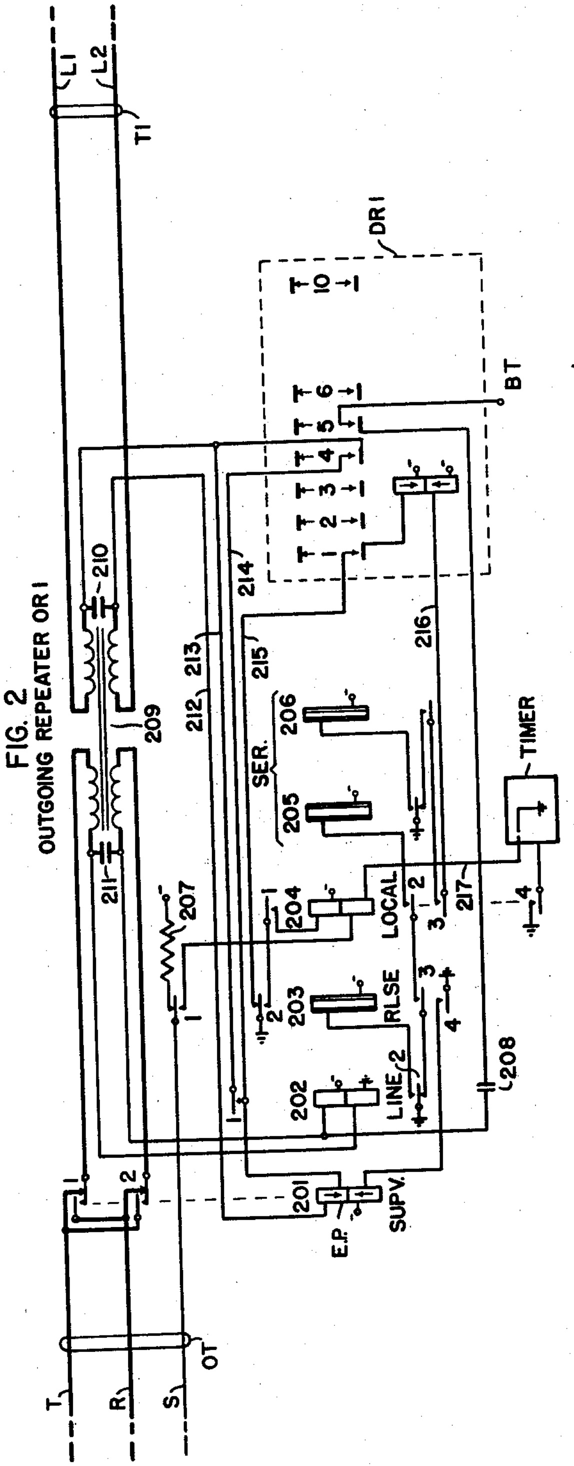
FIG. 2 OUTGOING REPEATER OR I
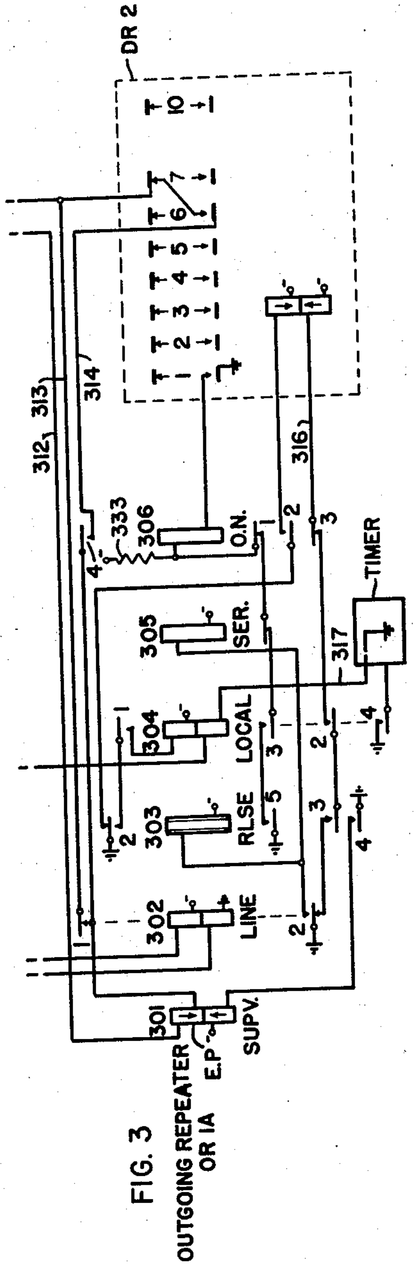
FIG. 3 OUTGOING REPEATER OR IA

United States Patent Office 2,934,605

TOLL-DISCRIMINATING OUTGOING REPEATER SYSTEM

John L. Culbertson, Harvey, Ill., assignor to International Telephone and Telegraph Corporation, New York, N.Y., a corporation of Maryland Application December 7, 1954, Serial No. 473,661

7 Claims. (Cl. 179—18)

This invention relates to a toll-discriminating outgoing repeater system. Its principal object is to provide a new and improved class-of-service discriminating arrangement for use in multi-exchange systems of the type employing combined toll and local interexchange trunks for preventing local subscribers using such trunks from availing themselves of toll features.

In telephone systems employing combined toll and free-service trunks interconnecting small exchanges, class discriminating arrangements are provided for interexchange connections to distinguish between toll and local calls so that busy verification and other special toll features are available to the toll operator but not to a local subscriber. Heretofore such class discrimination was accomplished by the forward or rearward transmission of special signals or controls over the interexchange trunk. In arrangements wherein the signals are transmitted forwardly, the signals are indicative of the class of the calling connection and serve to condition the equipment in the called exchange in accordance with the received class information. In arrangements wherein the signals are transmitted rearwardly, the signals are indicative of the type of connection desired in the called exchange and serve to condition the equipment in the calling exchange to permit or restrict further dialing, depending on the class of the calling connection. An arrangement for forwarding class-discriminating signals is disclosed in the United States Patent No. 2,427,650, issued September 23, 1947, to P. Bakker for Multiexchange Community Automatic Telephone System, and an arrangement for transmitting class-discriminating signals rearwardly is disclosed in the United States patent application of H. L. Horwitz et al., for Automatic Telephone System, Serial No. 426,516, filed April 29, 1954.

The above noted arrangements are not generally feasible in that the cost of providing special signalling equipment for the forward transmission of signals is often considerable and the arrangement for the transmission of signals rearwardly varies according to the types of interexchange trunks provided.

According to the invention, the necessity for the transmission of signals in either direction over the interexchange trunks is eliminated by arranging each trunk and associated terminal equipment to normally provide the usual toll features and by arranging the associated outgoing repeater to restrict locally-originated connections from calling any toll-feature digits. Timing for the locally-originated call is controlled by the associated outgoing repeater. In this manner, the trunks are arranged for toll service at all times, but local subscribers using such trunks cannot avail themselves of the toll features as the outgoing repeaters are arranged to detect the class of the calling connection and restrict the dialing of digits indicative of toll features if the connection is found to be locally-originated.

In a preferred embodiment, the outgoing repeaters are arranged to prevent locally-originated connections from calling any digit indicative of a toll feature by limiting the number of digit signals that can be transmitted over any connection.

In the second embodiment, the outgoing repeaters are arranged to prevent locally-originated connections from calling any digits indicative of toll features by detecting the values thereof and disabling the dialing circuit thereafter.

The above-mentioned and other features and objects of this invention and the manner of attaining them will become more apparent and the invention itself will be best understood, by reference to the following description of the invention taken in conjunction with the accompanying drawings comprising Figs. 1 to 3, wherein:

Fig. 2 shows in circuit diagram outgoing repeater OR1 of Fig. 1 arranged according to the first embodiment of the invention; and Fig. 3 shows outgoing repeater OR1 rearranged according to the noted second embodiment.

*General operation*

Figure 1:
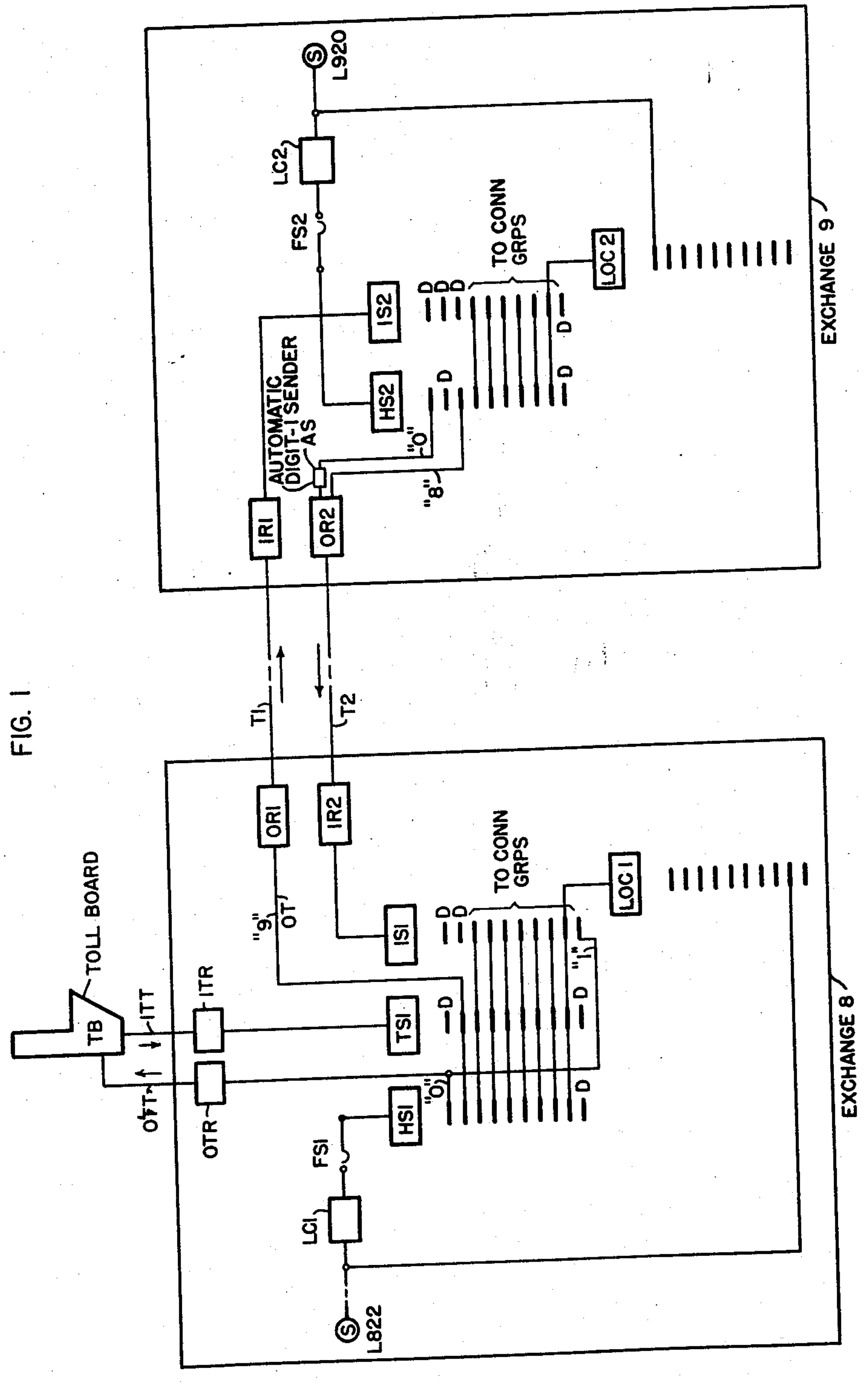
Fig. 1 shows a single-line switching diagram of a multi-exchange automatic telephone system embodying the invention.

Referring in particular to Fig. 1 of the drawings, the general operation of the disclosed system in handling toll and locally-originated calls will now be described.

Incoming toll repeater ITR, toll selector TS1, and local connector LOC1 of exchange 8, and incoming repeater IR1, incoming selector IS2, and connector LOC2 of exchange 9 are asumed to be similar to the corresponding items of apparatus disclosed in the United States patent application of E. J. Leonard, Serial No. 429,748, filed May 14, 1954, for a Busy-Verification Automatic Telephone System. In the noted application, the incoming repeaters, such as ITR and IR1, are arranged to project ground forward on the sleeve conductor to indicate to succeeding equipment that the call is a toll-originated call. The incoming selectors, TS1 and IS2 are arranged to respond to and absorb an initial digit indicative of a busy verification digit and forward a corresponding busy verification mark through the succeeding equipment to condition the connector for verification calls. The connectors LOC1 and LOC2 are combined toll and local connectors arranged to respond to the transmitted verification mark to condition them for busy verification operation. The connectors LOC1 and LOC2 are also arranged to handle locally-originated calls reaching them through the hundreds selectors. The hundreds selectors are not arranged to transmit a special mark and accordingly locally-originated calls cannot busy verify and are trouble timed and conversation timed.

Outgoing repeater OR1 of exchange 8 is a special repeater arranged to block locally-originated calls from exchange 8 from dialing digits indicative of a toll-service feature, the operation of such repeater being described hereinafter with reference to Figs. 2 and 3.

Outgoing repeater OR2 of exchange 9 is a repeater of the type wherein its seizure over one path automatically generates a digit 1 to direct the call to the toll operator in the called exchange while its seizure over a second path causes it to function as a regular repeater. For simplicity in illustrating such digit 1 generation, the automatic digit-1 sender AS is shown separate from outgoing repeater OR2, but it may be assumed to be similar to the digit-1 generating repeater of the noted H. L. Horwitz et al. application.

Incoming repeater IR2 of exchange 8 is a one-way repeater of the well-known type which is arranged to handle locally-originated calls received over its associated trunk T2. Exchanges 8 and 9 are interconnected by groups of one-way trunks similar to trunks T1 and T2, trunks T1 and T2, however, being the only ones shown.

A toll operator at toll board TB, desiring to call a local subscriber in exchange 8, makes connection to the incoming toll trunk ITT and is automatically connected to the associated toll selector TS1 through the incoming toll repeater ITR. Responsive to the dialing of the directory number of a line, such as line L822, the connection is extended through toll selector TS1 to a combined toll and local connector LOC1 from whence it is further extended to line L822 in the well-known manner.

In the event that the toll operator desired to busy verify line L822, an initial verification digit, such as the digit 6, is dialed which routes the toll call to the combined toll and local connector together with a special verification mark to condition it for toll operation, thereby permitting verification with no timing restrictions. The transmission of the special verification mark is similar to that described in the noted Leonard application.

The toll operator at toll board TB, desiring to call a subscriber in exchange 9, makes connection to toll selector TS1 as hereinbefore described and dials a trunk level digit indicative of lines of exchange 9, whereupon the connection is extended through outgoing repeater OR1 and over trunk T1 to the incoming repeater IR1 of exchange 9. The toll operator dials the directory number of a desired line in exchange 9 in the usual manner and the connection is extended through an incoming selector IS2 and a connector LOC2, to such called line.

In the event that the toll operator desires to busy-verify a line of exchange 9, a busy-verification prefix digit is dialed in incoming selector IS2 which as hereinbefore described, conditions connector LOC2 by the transmission of the special verification mark, permitting verification operations.

If a local line, such as line L822 of exchange 8 desires to call another line in the same exchange, line-finding action extends the calling line through the associated line circuit LC1 and the associated finder switch FS1 to the hundreds selector HS1. Responsive to the dialing of the hundreds digit of a directory number, the selector switch extends a connection to the connector and the subscriber thereupon dials a tens and units digit of a directory number to extend a connection to the called line in the well-known manner.

In the event the subscriber on line L822 of exchange 8 desires to call a subscriber in exchange 9, a trunk level digit 9, indicative of the lines of exchange 9 is dialed and the connection is thereupon extended from hundreds selector HS2 through outgoing repeater OR1, over trunk T1, and through incoming repeater IR1 to the special incoming selector IS2. The calling subscriber thereupon dials the directory number of the desired party in exchange 9 and the connection is further extended through incoming selector IS2 and connector LOC2 to the called line.

In order to prevent a local line of exchange 8 from busy verifying lines in exchange 9, outgoing repeater OR1 is arranged as hereinafter described to block the dialing therethrough from a local line of as many digits as there are in a busy verification number If a local line, such as line L920 in exchange 9, desires to call another line in the same exchange, line-finding action extends the calling line L920 through the associated line circuit LC2 and the associated finder switch FS2 to a regular hundreds selector HS2. Responsive to the dialing of the hundreds, tens, and units digit of the desired line, the connection is extended to a called line in the usual manner. The calling line cannot busy-verify as hundreds selector HS2 is not arranged to transmit a verification mark forward, and accordingly connector LOC2 is not conditioned for busy verification operation.

Assuming line L920 desires to call the toll operator at toll board TB, responsive to the extension of a connection to the hundreds selector HS2, a trunk level digit 0 is dialed which causes outgoing repeater OR2 to automatically generate a digit 1 which is repeated through incoming repeater IR2 of exchange 8 to cause incoming selector IS1 to extend a connection to the toll board TB through outgoing repeater OTR and over outgoing toll trunk OTT.

In the event that the call from line L920 is to a local subscriber in exchange 8, the dialing of a trunk level digit 8, indicative of local lines in exchange 8, causes outgoing repeater OR2 to function as a regular repeater and repeat any received digit information to incoming selector IS1. Incoming selector IS1 accordingly responds to received digit information to extend a connection through a local connector LOC1 to the desired line. Incoming hundreds selector IS1 is not arranged to transmit a verification mark forward and accordingly subscribers in exchange 9 cannot busy-verify lines in exchange 8.

The operation of the system embodying the invention having been described generally, a detailed description will now be given.

*Detailed description*

Referring now in particular to Fig. 2 of the drawings, a detailed description will be given of outgoing repeater OR1. As hereinbefore described, outgoing repeater OR1 is arranged to permit any desired digits to be transmitted over a toll connection is arranged to restrict the dialing of certain toll digits on connections originated by local subscribers.

In the chosen first embodiment, in order for an ordinary connection to be established from a local subscriber in exchange 8 or from the toll operator to a subscriber in exchange 9, four digits must be dialed, comprising the trunk level digit 9, and the hundreds, tens and units digit of the called line. In order to busy-verify a line, however, additional digits are required for a total of five or more digits. Accordingly, a digit-counting arrangement may be utilized to distinguish between busy verification calls and regular calls.

When outgoing repeater OR1 is seized, by usual selector action over originating trunk OT, the usual bridge across the line conductors is extended through break contacts 1 and 2 of supervisory relay 201 and through the left-hand winding of repeating coil 209 to the battery and ground connected windings of line relay 202.

Line relay 202 operates and at its contacts 1 bridge the upper winding of the electro-polarized supervisory relay 201 across the conductors L1 and L2 of the associated interexchange trunk line T1 through the right-hand winding of repeating coil 209. This closed loop across the conductors L1 and L2 seizes the incoming repeater IR1 of the exchange 9 in the well-known manner.

Contacts 2 of line relay 202 operate release relay 203. Contacts 1 of relay 203 transfer the sleeve conductor S of the calling connection from idle-indicating battery to the normally grounded lower winding of local relay 204; its contacts 2 prepare a locking circuit for relay 204; its contacts 3 prepare an operate circuit for series relay 205; and its make contacts 4 energize the local winding of supervisory relay 201. Relay 201 does not operate at this time as the current flow through the windings is in opposing relationship until the call is answered.

Assuming the operator at toll board TB seized the outgoing repeater OR1, ground potential from repeater ITR is projected forward on the sleeve conductor S of the connection, repeater ITR being a toll repeater, and is extended through make contacts 1 of release relay 203 to the lower winding of local relay 204. With the other side of such winding being normally grounded by the timer, local relay 204 fails to operate.

Responsive to the dialing of the directory number of the desired subscriber in exchange 9, the line loop across the battery and ground connected windings of relay 202 is opened and closed by the usual dial contacts, causing relay 202 to restore and reoperate accordingly. Responsive to the restorations and reoperations of relay 202, its contacts 1 open and close the bridge across the outgoing conductors L1 and L2 of trunk T1 thereby transmitting a corresponding series of impulses to the repeater in exchange 9. At the same time, ground pulses are transmitted to the battery-connected winding of relay 203, maintaining it operated, relay 203 being slow-restoring.

Responsive to the dialing of the directory number of the desired line in exchange 9, incoming repeater IR1 repeats such received digits and causes the connection to be extended to the desired called line in exchange 9. Responsive to answer by the called line, current flow over the interexchange trunk conductors is reversed, thereby reversing the current flow through the upper winding of supervisory relay 201. Supervisory relay 201 thereupon operates, and at its contacts 1 and 2, reverses the current flow over the tip and ring conductors of trunk OT to provide any desired supervisory function.

The toll operator may converse with the called subscriber over the established connection through the windings of the repeat coil 209 and condensers 210 and 211.

In the event the toll operator desired to busy-verify, a verification digit is dialed which causes the incoming selector IS2 to condition the connector LOC2 for busy verification, in the manner described in the noted Leonard application.

When the receiver is replaced on the called line, supervisory relay 201 restores as a consequent current reversal causes the windings thereof to again oppose each other. Responsive to the release of relay 201, the current flow over the tip and ring conductors of trunk branch OT is thereby restored to normal direction.

When the connection is broken at calling toll board TB, line relay 202 restores and at its contacts 1 opens the bridge across the outgoing trunk T1, and at its contacts 2 open-circuits release relay 203. Release relay 203 restores shortly thereafter, its contacts 4 deenergizing the local winding of supervisory relay 201 and its contacts 1 removing ground potential from the sleeve conductor and replacing it with battery potential from current-limiting resistor 207, thereby marking outgoing repeater OR1 idle again.

In the event the outgoing repeater OR1 is seized by a local subscriber, such as subscriber S on line L822, hundreds selector HS1 does not project ground potential forward on the sleeve conductor S but depends on ground being projected rearwardly to maintain the connection. Accordingly, responsive to the operation of relay 203 when repeater OR1 is seized from a local line, the connection through the finder switch FS1 and the line circuit LC1 is maintained from ground potential from the timer through the lower winding of local relay 204, and through make contacts 1 of relay 203 to the sleeve conductor S. Responsive to the consequent current flow over such path, relay 204 operates, and locks through its upper windings and its contacts 1 to ground at make contacts 2 of release relay 202.

At such time, relays 202, 203 and 204 are operated. Make contacts 2 of local relay 204 prepares an operate circuit for series relay 205; its make contacts 3 prepares an operate circuit for the digit register DR1; and its makes contacts 4 starts the timer into operation.

Responsive to the dialing of the digits indicative of the desired line in exchange 9, line relay 202 restores and reoperates for each impulse in the series and at its make contacts 1 opens and closes the line loop across the trunk conductors L1 and L2 thereby repeating such digit information to the incoming repeater IR1 of exchange 9. At the same time, its break contacts 2, through make contacts 3 of release relay 203 and make contacts 2 of local relay 204 transmit ground impulses to the battery-connected winding of series relay 205. At such time release relay 203 remains operated and series relay 205 operates and remains operated during the transmission of the impulses of any digit. Series relay 205 at its make contacts, operates series relay 206.

On completion of the dialing of any digit of the called number, line relay 202 comes to rest, operated, and removes ground potential from the battery-connected winding of series relay 205 permitting such relay to restore a fraction of a second later. At such time, with relay 205 restored and slow-releasing relay 206 yet operated, ground potential is extended through back contacts of series relay 205 and through make contacts of series relay 206 to the battery-connected winding of digit register DR1 through make contacts 3 of operated local relay 204 and wire 216.

Digit register DR1 of Fig. 2 and register DR2 of Fig. 3 are magnetic impulse counters generally similar to those disclosed in the United States Patent No. 2,538,818 of J. I. Bellamy, issued January 1, 1951, for a Magnetic Impulse Counter.

Responsive to the noted ground appearing on wire 216 extending to the battery-connected operating winding of register DR1, register DR1 actuates its contact set 1, causing them to shift to their alternate position.

After a slight interval, relay 206 restores and removes ground from wire 216.

Responsive to the dialing of each succeeding digit, series relays 205 and 206 operate at the start of each series of impulses and restore upon the completion thereof to deliver one ground impulse to digit register DR1 over conductor 216 to cause it to actuate its contact sets in succession according to the number of digits dialed.

On completion of the dialing of the fourth digit of the directory number of the desired subscriber in exchange 9, digit register DR1 actuates its contact sets 4, which connects wire 213 to wire 214 to thereby effectively shunt make contacts 1 of line relay 202. At such time, while line relay 202 is operative to respond to further dialing, no digit information will be transmitted over trunk lines L1 and L2 as the pulsing contacts 1 of line relay 202 are shorted. In this manner, the local subscribers are limited to the dialing of four digits.

In the event, however, a further digit is forthcoming, series relays 205 and 206 function as hereinbefore described and deliver another ground pulse to wire 216, advancing digit register DR1 one further step, thereby actuating its contact set 5. At such time, make contacts 5 supply busy tone through tone-coupling condenser 208 to the ring conductor R of the originating trunk OT, thereby indicating to the calling subscriber that the connection cannot be completed.

In the event that the calling subscriber fails to heed the busy-tone signal, after a slight interval, the timer reaches a point which removes ground potential from the lower winding of local relay 204 permitting it to restore and permitting the connection to be dropped by the forced removal of ground from the sleeve conductor S of the calling extension.

Responsive to the calling of the desired subscriber by the proper number of digits, the connection is extended to the called subscriber in the normal manner and supervisory relay 201 operates as hereinbefore described to provide any supervisory function. The timer then functions to provide the usual conversation timing.

Responsive to disconnect by the calling and called parties, line relay 202 restores thereby restoring release relay 203 and local relay 204. At such time all relays are restored, but register DR1 is in its last operated position. Responsive to the restoration of release relay 203, ground potential is placed on wire 215 and is extended through make contacts 1 of digit register DR1 to energize the restoring winding of digit register DR1. The energizing of the restoring winding of digit register DR1 generates a flux opposing the residual magnetism holding the counter operated and such counter restores, thereby returning the outgoing repeater to normal idle condition.

In view of the foregoing, it is apparent that ground being projected forward on the sleeve conductor S of the connection to outgoing repeater OR1 conditions it to permit any number of digits to be dialed into incoming repeater IR1 of the exchange 9, and consequently any toll-feature digits may be dialed. However, in the event that no ground is projected forward local relay 204 operates, and digit register DR1 is called into operation to limit the number of digits that may be dialed, thereby preventing the local subscriber from dialing any more digits than are required to set up a free service connection.

*Second embodiment*

Referring now to Fig. 3 of the drawings, a second embodiment of the invention will be described. Outgoing repeater OR1A shown in Fig. 3 is similar to outgoing repeater OR1 of Fig. 2 except as hereinafter pointed out.

In the first embodiment of the invention, the local subscriber was restricted from dialing any digits indicative of toll features by limiting the number of digits dialed. In the second embodiment, the local subscribers are prevented from dialing toll-feature digits by arranging the outgoing repeater OR1A to detect such digits and to prevent further signalling thereafter.

It has been chosen to illustrate the invention as one restricting the dialing of an initial digit 6, to prevent a local subscriber from availing themselves of the busy-verifying features.

In the manner hereinbefore described with reference to Fig. 2 of the drawings, on a toll connection from the toll operator line relay 302 operates and operates release relay 303 to seize the distance exchange over the trunk line conductors L1 and L2. Since ground potential appears on the sleeve conductor S, local relay 304, being similar to relay 204 of Fig. 2 fails to operate and the operations in transmitting digits to the distant exchange 9 is as hereinbefore described with reference to Fig. 2, dial pulses being repeated to the distance exchange by the opening and closing of the bridge across conductors 312 and 313.

In the event a local subscriber seizes outgoing repeater OR1A, local relay 304 operates through its lower winding and locks operated through its contacts 1 to ground at make contacts 2 of release relay 303, both in the manner hereinbefore described.

At the time line relay 302 operated its make contacts 2, extended operating ground potential to the battery-connected winding of slow-release relay 303 and extended operating ground potential to the battery-connected winding of slow-operating series relay 305. Relay 305 is so adjusted that it will not remain operated during dialing but remains operated when line relay 302 is at rest operated. Accordingly, responsive to the dialing of any digit, series relay 305 restores and remains restored throughout the momentary restorations of line relay 302. Upon completion of the dialing of any digit, line relay 302 remains operated for a substantial period of time and series relay 305 again operates and remains operated until the start of the dialing of the next succeeding digit.

Responsive to the dialing of the first digit of the directory number of the desired subscriber, line relay 302 restores and reoperates according to the impulses in the dialed digit. Responsive to each restoration and reoperation of line relay 302, conductors 312 and 313 are momentarily opened for each impulse in the series constituting the digit, thereby repeating such digit to the distant exchange. At its break contacts 2, it delivers ground impulses through make contacts 3 of release relay 303, make contacts 2 of local relay 304 and break contacts 3 of off-normal relay 306 to wire 316, extending to the battery-connected operating winding of digit register DR2.

Digit register DR2 responds to the impulses appearing on its operate winding and actuates its contacts successively responsive respectively to the impulses appearing on wire 316. Assuming the digit dialed to be any digit other than 6, digit register DR1 actuates its contact sets successively and upon completion of the dialing comes to rest with its operated contacts in the position corresponding to the value of the digit dialed.

Responsive to the operation of the digit register DR2 in accordance with the first received pulse of the first dialed digit, its make contacts 1 extend ground potential to one side of the winding of off-normal relay 306, the other side of the winding of such relay having ground potential appearing thereon from make contacts 5 of release relay 303, through make contacts 3 of local relay 304, break contacts of series relay 305, and break contacts 1 of relay 306. With ground appearing on both sides of relay 306, relay 306 is prevented from operating.

On completion of the dialing of the first digit, line relay 302 comes to rest operated and an operate path for series relay 305 again is closed for a substantial period of time, permitting it to reoperate. At such time, the ground appearing on the one side of the winding of off-normal relay 306 is removed by the break contacts on now operated series relay 305, and relay 306 operates from ground at make contacts 1 of digit register DR2 and battery through current-limiting resistor 333. Off-normal relay 306 at its break contacts 1 opens its shunting circuit to prevent it being restored responsive to the release of series relay 305 when any succeeding digit is dialed.

Make contacts 2 of off-normal relay 306 prepares the clearout path for the register; its break contacts 3 opens the operating circuit of register DR2; and its make contacts 4 connect wire 314 to one side of the polarized winding of relay 301.

If a digit other than the digit 6 is dialed, make contacts 6 of register DR2 remain unoperated or break contacts 7 operate. In either event, wire 314 is maintained disconnected from wire 313 and pulsing contacts 1 of relay 302 are not shunted. Accordingly, responsive to further dialing, the impulses constituting succeeding digits are transmitted over trunk T1, register DR2 not operating further responsive to its operating circuit being open at contacts 2 of relay 306.

Assuming the first digit dialed to be the verification digit 6, register DR2, in response to the ground impulses appearing on wire 316, actuates its first six contact sets, shifting them to their alternate positions.

At such time, on completion of the dialing of the digit 6, off-normal relay 306 operates as hereinbefore described and at its make contacts 4, together with make contacts 6 and break contacts 7 of register DR2, shunts pulsing contacts 1 of line relay 302 by connecting wire 314 to wire 313.

The succeeding digits of any desired number are prevented from being transmitted as conductors 312 and 313 are prevented from being opened.

In the manner above described, a local subscriber is permitted to dial any digits of called telephone numbers excepting the digit indicative of a toll feature.

While not being illustrated, it is apparent such arrangement could be utilized for any single digit or more than one digit as desired.

Responsive to called party answer, the hereinbefore described operations occur generally as described with reference to Fig. 2.

When the connection is broken at the originating equipment, line relay 302, release relay 303, local relay 304, if operated, and series relay 305 restore. Off-normal relay 306 and register DR2 are yet operated.

Ground from break contacts 2 of release relay 303 is extended through make contacts 2 of relay 306 to restore register DR2 by energizing its restoring winding. Responsive to the opening of its make contacts 1, register DR2 restores off-normal relay 306 returning repeater OR1A to normal idle condition.

The timer in outgoing repeater OR1A provides the necessary conversation and permanent timing and functions only on locally-originated calls, as it is under control of local relay 304, which operates on local connections only.

I claim:

1. In a multi-exchange telephone system, a trunk extending from a first exchange to a second exchange, switching apparatus in the first exchange for extending successive connections from calling lines and over the trunk to the second exchange, any said connection being either of a first class or of a second class, trunk apparatus in the first exchange for the said trunk, class-indicating means in the trunk apparatus and means for conditioning it for each said connection to indicate the class of such connection, repeating means in the trunk apparatus responsive to numerical control exercised over the calling line in any said connection of either class for transmitting signals over the trunk to the second exchange indicative of a desired connection of a first type or of a second type from the trunk to a called line of the second exchange, type-indicating means in the trunk apparatus directly responsive to the said numerical control for indicating the type of the connection desired in the second exchange, switching apparatus in the second exchange responsive to any said signals received over the trunk to extend the indicated type of connection, and means in the trunk apparatus controlled jointly by the said type-indicating means and the said class-indicating means for barring the transmission over the trunk of signals indicative of a connection of the second type responsive to control exercised over a connection of the second class.

2. In a telephone system according to claim 1, wherein the signals transmitted comprise series of digit signals indicative respectively of successive digits of a called number and wherein the number of digits in a called number is indicative of the type of connection desired, means in the said barring means for preventing the transmission of digit signals in excess of the number of series of digit signals indicative of a connection of the second type.

3. In a telephone system according to claim 2, a digit register in the said indicating means in the first exchange, means responsive to the said numerical control exercised over a connection of the second class for setting the register in accordance with the number of series of digit signals transmitted, and means included in the said barring means controlled by the setting of the register in accordance with a number of series of digit signals indicative of a connection of the first type for barring the further transmission of digit signals.

4. In a telephone system according to claim 1, wherein the said signals transmitted comprise series of digit signals indicative respectively of successive digits of a called number and wherein the digits of a called number includes a distinctive digit corresponding to the type of connection desired, means in the said barring means responsive to the transmission of series of digit signals indicative of a distinctive digit corresponding to a said first type connection for preventing the further transmission of digit signals.

5. In a telephone system according to claim 4, a digit register in the said indicating means in the first exchange, means responsive to the said numerical control exercised over a connection of the second class for setting the register in accordance with the number of digit signals in a series, and means included in the said barring means controlled by the setting of the register in accordance with a number of digit signals indicative of the value of a distinctive digit corresponding to a first type connection for barring the further transmission of digit signals.

6. In a telephone system according to claim 1, timing means in the first exchange and means controlled thereby for clearing out the said connection after a predetermined interval of time, and means for disabling the said timing means responsive to the said connection being of the first class.

7. In a telephone system according to claim 1, each said connection from a calling line including a test conductor having a class-marking indication thereon indicative of the class of the said connection, the said type-indicating means including means responsive to the test conductor of any connection having a class-marking indication thereon indicative of a connection of the first class for disabling the said means for barring transmission of signals.

References Cited in the file of this patent

UNITED STATES PATENTS

| | | |
|---|---|---|
| 2,317,833 | Voss | Apr. 27, 1934 |
| 2,445,000 | Ostline | July 13, 1948 |
| 2,544,944 | Wicks | Mar. 13, 1951 |
| 2,567,650 | Morris | Sept. 11, 1951 |
| 2,580,709 | Wicks | Jan. 1, 1952 |
| 2,615,092 | Lomax | Oct. 21, 1952 |
| 2,806,086 | Fisher | Sept. 10, 1957 |
| 2,807,669 | Pharis | Sept. 24, 1957 |
| 2,823,264 | Pharis | Feb. 11, 1958 |